United States Patent
Yoshida

(10) Patent No.: US 10,059,202 B2
(45) Date of Patent: Aug. 28, 2018

(54) HYDRAULIC CONTROL DEVICE FOR DRIVE POWER DISTRIBUTION DEVICE

(71) Applicant: HONDA MOTOR CO., LTD., Tokyo (JP)

(72) Inventor: Yuma Yoshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/551,413

(22) PCT Filed: Feb. 16, 2016

(86) PCT No.: PCT/JP2016/054430
§ 371 (c)(1),
(2) Date: Aug. 16, 2017

(87) PCT Pub. No.: WO2016/133083
PCT Pub. Date: Aug. 25, 2016

(65) Prior Publication Data
US 2018/0037110 A1   Feb. 8, 2018

(30) Foreign Application Priority Data

Feb. 17, 2015  (JP) ................................. 2015-028620

(51) Int. Cl.
*B60K 17/348*   (2006.01)
*F16D 48/04*    (2006.01)
(Continued)

(52) U.S. Cl.
CPC ........ *B60K 17/348* (2013.01); *B60K 17/3462* (2013.01); *B60K 23/0808* (2013.01);
(Continued)

(58) Field of Classification Search
CPC .............. B60K 17/348; B60K 17/3462; B60K 23/0808; B60K 28/165; F16D 48/04; F16H 61/12
(Continued)

(56) References Cited

U.S. PATENT DOCUMENTS 5,032,995 A      7/1991  Matsuda et al.
5,148,903 A *    9/1992  Kobayashi ............. B60K 17/35
                                                192/106 F
(Continued)

FOREIGN PATENT DOCUMENTS

JP    2-068225 A    3/1990
JP    7-186765 A    7/1995
(Continued)

OTHER PUBLICATIONS

International Search Report dated Apr. 12, 2016, issued in counterpart International Application No. PCT/JP2016/054430 (2 pages).
(Continued)

*Primary Examiner* — Kevin Hurley
*Assistant Examiner* — Felicia L. Brittman
(74) *Attorney, Agent, or Firm* — Westerman, Hattori, Daniels & Adrian, LLP

(57) ABSTRACT

A device is provided which performs highly-accurate control in low-torque regions while taking advantage of hydraulic pressure sealed-type hydraulic control devices. The device includes: a first characteristic (sealed pressurization) obtained by closing the on/off valve and driving an oil pump: a second characteristic (sealed depressurization) obtained by disabling drive of the oil pump and opening the on/off valve; and a third characteristic (flow-rate control) obtained by opening the on/off valve and driving the oil pump. In the process of supplying hydraulic pressure to a piston chamber in a low torque region, the device performs control accord- (Continued)

ing to the third characteristic. In the process of pressurizing the piston chamber in a torque region higher than the low torque region, the device performs control according to the first characteristic. In the subsequent process of depressurizing the piston chamber, the device performs control according to the second characteristic.

3 Claims, 8 Drawing Sheets

(51) Int. Cl.
  *B60K 23/08* (2006.01)
  *B60K 17/346* (2006.01)
  *B60K 28/16* (2006.01)
  *F16H 61/12* (2010.01)
(52) U.S. Cl.
  CPC .......... *F16D 48/04* (2013.01); *B60K 28/165* (2013.01); *F16H 61/12* (2013.01)
(58) Field of Classification Search
  USPC ........................................................ 180/233
  See application file for complete search history.

(56) References Cited

U.S. PATENT DOCUMENTS

| 5,811,679 | A | * | 9/1998 | Hara | ..................... B60T 8/1769 324/161 |
| 9,239,066 | B2 | * | 1/2016 | Sugo | ..................... B60K 17/348 |

FOREIGN PATENT DOCUMENTS

| JP | 2001-206092 A | 7/2001 |
| JP | 2004-19768 A | 1/2004 |
| JP | 2013-67326 A | 4/2013 |
| JP | 2013-154827 A | 8/2013 |
| JP | 5607240 B2 | 10/2014 |

OTHER PUBLICATIONS

Decision to Grant a Patent dated Jun. 13, 2017, issued in counterpart Japanese Patent Application No. 2017-500684 in Japanese (3 pages).

* cited by examiner

HYDRAULIC CONTROL DEVICE FOR DRIVE POWER DISTRIBUTION DEVICE

FIELD OF INVENTION

The present invention relates to a hydraulic control device which controls hydraulic pressure used to generate engagement pressure of a clutch included in a drive power distribution device of a four-wheel-drive vehicle. The drive power distribution device distributes drive power from an engine to main driving wheels and auxiliary driving wheels.

BACKGROUND ART

Some conventional four-wheel-drive vehicles include a drive power distribution device for distributing drive power generated by a drive source, such as an engine, to main driving wheels and auxiliary driving wheels. In this kind of four-wheel-drive vehicles, when the front wheels are main driving wheels while the rear wheels are auxiliary driving wheels, for example, the drive power generated at the drive source is transmitted to the front wheels through a front drive shaft and a front differential while being transmitted to a drive power distribution device including a multiple disc clutch through a propeller shaft. Hydraulic fluid is then supplied at a predetermined pressure from a hydraulic control device to the drive power distribution device to control the engagement pressure of the drive power distribution device. A predetermined proportion of the drive power from the drive source is thereby transmitted to the rear wheels.

Examples of the hydraulic control device configured to control the hydraulic pressure supplied to the multiple disc clutch of the drive power distribution device include hydraulic control devices shown in Patent Literatures 1 and 2. Each of the hydraulic control devices shown in Patent Literatures 1 and 2 includes an electric oil pump supplying hydraulic fluid to a hydraulic chamber that presses the multiple disc clutch. The electric oil pump and hydraulic chamber are connected through a hydraulic pressure supply path. The hydraulic control device controls the revolutions of the electric pump so that the discharge value of the electric pump is equal to the required hydraulic pressure of the hydraulic clutch. The hydraulic control device described in Patent Literature 2 controls motor drive of the electric pump so as to generate hydraulic pressure corresponding to the distribution ratio of drive power. The hydraulic control devices of Patent Literatures 1 and 2 are configured to supply hydraulic pressure necessary for the hydraulic clutch by driving the electric pump. The electric oil pump therefore needs to be always operated while the hydraulic clutch is engaged. Accordingly, it is difficult to guarantee the durability of the motor (brush wear) when the motor to drive the electric oil pump is a brushed motor.

In this light, Patent Literature 3 proposes a hydraulic pressure sealed-type hydraulic control device using a motor and a solenoid valve. In this hydraulic pressure sealed-type hydraulic control device, the hydraulic pressure path to supply hydraulic fluid from an oil pump driven by the motor to a piston chamber of a clutch for distributing drive power is provided with a hydraulic fluid sealing valve to seal hydraulic fluid and a solenoid valve (an on-off valve) to open and close the fluid path between the hydraulic fluid sealing valve and piston chamber. In order to pressurize the piston chamber, the hydraulic pressure sealed-type hydraulic control device closes the solenoid valve and drives the oil pump with the motor in a stepwise manner to perform control so that the pressure in the piston chamber becomes commanded hydraulic pressure. In order to depressurize the piston chamber, the hydraulic pressure sealed-type hydraulic control device disables drive of the oil pump and opens and closes the solenoid valve in a stepwise manner to perform control so that the pressure in the piston chamber becomes the commanded hydraulic pressure. In such a manner, the motor is driven only to pressurize the piston chamber and is not driven to depressurize the piston chamber. This can reduce the frequency of use of the motor, improving the durability.

CITATION LIST

Patent Literature

[Patent Literature 1] Japanese Patent Laid-open Publication No. 2004-19768
[Patent Literature 2] Japanese Patent Laid-open Publication No. 2001-206092
[Patent Literature 3] Japanese Patent Publication No. 5607240

However, only the hydraulic pressure sealed control as illustrated in Patent Literature 3 cannot provide highly accurate control especially in a low transmission torque region in some cases. To be specific, in some cases, the stepwise drive of the oil pump cannot provide control following minute fluctuations in the target value (command value) when the commanded hydraulic pressure is low.

SUMMARY OF INVENTION

The invention was made in the light of the aforementioned points. An object of the invention is to provide highly accurate control in a low-torque region with no detriment while taking advantage of the hydraulic pressure sealed-type hydraulic control device.

The present invention is a hydraulic control device of a drive power distribution device of a four-wheel drive vehicle, the four-wheel drive vehicle including: a drive power transmission path to transmit drive power from a drive source to a main driving wheel and an auxiliary driving wheel; and a drive power distribution device provided between the drive source and the auxiliary driving wheel in the drive power transmission path, the drive power distribution device being composed of a frictional engagement element including: a plurality of friction materials stacked on top of each other; and a piston chamber generating hydraulic pressure against a piston configured to press the friction materials in the stacking direction to engage the friction materials, the hydraulic control device including: a hydraulic circuit including: an oil pump which is driven with a motor and supplies hydraulic fluid to the piston chamber; a hydraulic fluid sealing valve configured to seal the hydraulic fluid to a fluid path allowing communication between the oil pump and the piston chamber; an on-off valve configured to open and close the fluid path between the hydraulic fluid sealing valve and the piston chamber; and an accumulator configured to reserve the hydraulic pressure for the piston chamber, and a controller configured to control drive of the oil pump by the motor and opening and closing of the on-off valve to supply a desired hydraulic pressure to the piston chamber. Characteristics of the hydraulic pressure given to the piston chamber through the hydraulic circuit include: a first characteristic obtained by closing the on-off valve and driving the oil pump; a second characteristic obtained by disabling the drive the oil pump and opening the on-off valve; and a third characteristic obtained by opening the on-off valve and driving the oil pump. The controller, in the process of supplying hydraulic pressure to the piston chamber in a predetermined low-torque region, performs control according to the third characteristic so that the pressure in the piston chamber becomes a commanded hydraulic pressure, in the process of pressurizing the piston chamber in a torque region higher than the low-torque region, performs control according to the first characteristic so that the pressure in the piston chamber becomes the commanded hydraulic pressure, and in the subsequent process of depressurizing the piston chamber, performs control according to the second characteristic so that the pressure in the piston chamber becomes the commanded hydraulic pressure, and the controller performs control to limit the drive of the motor at transition from the third characteristic to the first characteristic.

The hydraulic control device according to the present invention employs the sealed-type hydraulic circuit as described above and stops drive of the oil pump by the motor after the piston chamber is pressurized to the commanded hydraulic pressure. The hydraulic pressure of the hydraulic fluid sealed in the fluid path can keep the fastening force of the clutch constant until the piston chamber starts to be depressurized. This allows the motor for driving the oil pump to intermittently operate while the engagement pressure of the clutch is being produced. The frequency of use of the motor is therefore reduced, thus improving the durability. On the other hand, to supply hydraulic pressure to the piston chamber in a predetermined low torque region, the hydraulic control device controls the hydraulic pressure according to the third characteristic, which is obtained by opening the on-off valve and driving the oil pump, so that the pressure of the piston chamber becomes the commanded hydraulic pressure (when the on-off valve is opened, the hydraulic control is non-sealed control that is, flow-rate control by the motor). This enables fine hydraulic control, providing highly accurate four-wheel-drive mode in the low torque transmission region for the auxiliary driving wheel. Moreover, the hydraulic control device performs control to limit the drive of the motor at least just before the transition from the third to first characteristic. This can prevent overshoot (exceeding the commanded hydraulic pressure) of the actual hydraulic pressure which can occur just after the transition to the first characteristic due to the motor's inertia at the transition.

In an embodiment, the controller may perform control so as to limit the drive of the motor in the region where the deviation between the commanded hydraulic pressure and actual hydraulic pressure in the piston chamber is small at the transition from the third to first characteristic. In the region where the deviation between the commanded hydraulic pressure and actual hydraulic pressure is small, the actual hydraulic pressure is close to the commanded hydraulic pressure. Accordingly, the overshoot problem is likely to occur even if the undesired increase in the actual hydraulic pressure is relatively slight. To the contrary, in the region where the deviation between the commanded hydraulic pressure and actual hydraulic pressure is large, the actual hydraulic pressure is quite different from the commanded hydraulic pressure, and some increase in the actual hydraulic pressure is less likely to create an overshoot problem. In such a case, it is preferable that the drive of the motor is not limited (or limited by a smaller degree) so that the actual hydraulic pressure easily follows the commanded hydraulic pressure. By selectively limiting drive of the motor depending on the magnitude of the hydraulic pressure deviation in such a manner, the overshoot problem of hydraulic pressure is solved efficiently.

In another embodiment, in the region where the deviation between the commanded hydraulic pressure and actual hydraulic pressure is small, the controller may perform control so that the smaller the deviation, the higher the ratio at which the drive of the motor is limited. This can prevent overshoot of the actual hydraulic pressure which can be caused by the inertia of the motor at the transition from the third to first characteristic without degrading the following performance during the hydraulic pressure control according to the third characteristic. In the region where the deviation of the commanded hydraulic pressure and the actual hydraulic pressure is small, the larger the deviation, the lower the ratio at which the drive of the motor is limited, so that the following performance of the hydraulic pressure control can be relatively improved.

MODES FOR CARRYING OUT THE INVENTION

Figure 1:
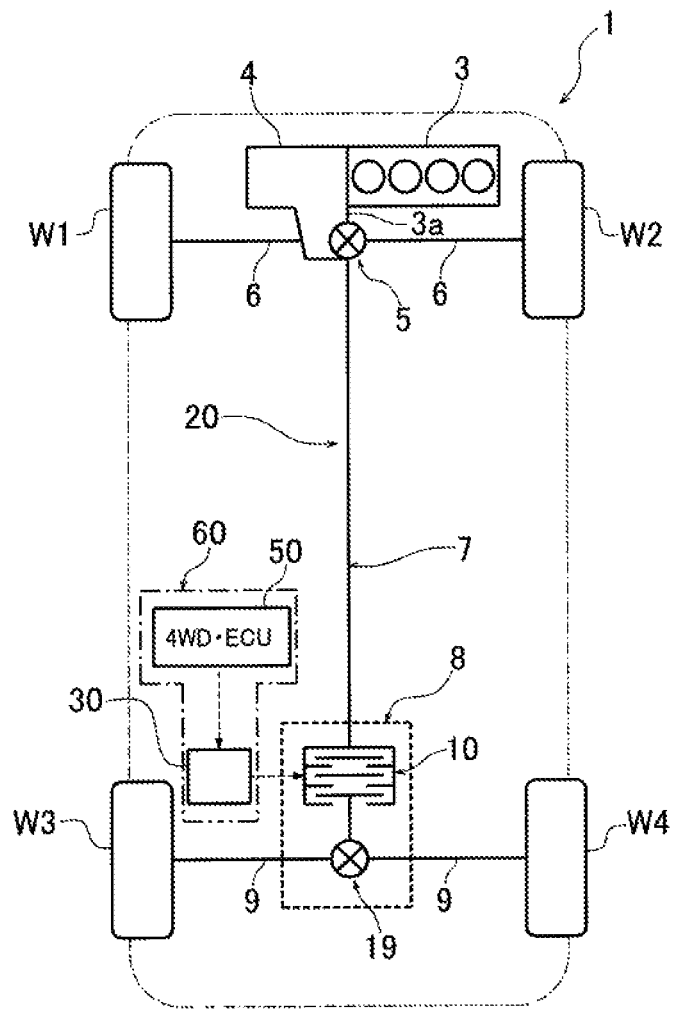
FIG. 1 is a diagram illustrating a schematic configuration of a four-wheel-drive vehicle including a hydraulic control device for a drive power distribution device according to an embodiment of the invention.

FIG. 1 is a diagram illustrating a schematic configuration of a four-wheel-drive vehicle including a hydraulic control device for a drive power distribution device according to an embodiment of the invention. A four-wheel-drive vehicle 1 illustrated in FIG. 1 includes: an engine (a drive source) 3 placed transversely in the front of the vehicle; an automatic transmission 4 integrally installed with the engine 3; and a drive power transmission path 20 configured to transmit drive power from the engine 3 to front wheels W1 and W1 and rear wheels W3 and W4.

The output shaft (not illustrated) of the engine 3 is coupled to the left and right front wheels W1 and W2 as main driving wheels through the automatic transmission 4, a front differential (hereinafter, referred to as a "front diff") 5, and left and right front drive shafts 6 and 6. The output shaft of the engine 3 is further coupled to the left and right rear wheels W3 and W4 as auxiliary driving wheels through the automatic transmission 4, the front diff 5, the propeller shaft 7, a rear differential unit (hereinafter, referred to as a "rear diff unit") 8, and left and right rear drive shafts 9 and 9.

The rear diff unit 8 includes: a rear differential (hereinafter, referred to as a "rear diff") 19 to distribute drive power to the left and right rear drive shafts 9 and 9; and a front and rear torque distribution clutch 10 to connect and disconnect the drive power transmission path from the propeller shaft 7 to the rear diff 19. The front and rear torque distribution clutch 10 is a hydraulic clutch and is a drive power distribution device to control drive power to be distributed to the rear wheels W3 and W4 in the drive power transmission path 20. The four-wheel-drive vehicle 1 further includes: a hydraulic circuit 30 to supply hydraulic fluid to the front and rear torque distribution clutch 10; and a 4WD•ECU (hereinafter, just referred to as ECU) 50 as a controller to control the hydraulic pressure supplied by the hydraulic circuit 30. The ECU 50 is composed of a microcomputer and the like.

The ECU 50 controls the hydraulic pressure supplied by the hydraulic circuit 30 to control drive power distributed to the rear wheels W3 and W4 at the front and rear torque distribution clutch (hereinafter, just referred to as a clutch) 10. Drive control is thereby performed with the front wheels W1 and W2 as the main driving wheels and the rear wheels W3 and W4 as the auxiliary driving wheels.

When the clutch 10 is released (disconnected), rotation of the propeller shaft 7 is not transmitted to the rear diff 19 side, and all the torque of the engine 3 is transmitted to the front wheels W1 and W2, so that the four-wheel-drive vehicle 1 is in the front-wheel drive (2WD) mode. On the other hand, when the clutch 10 is connected, rotation of the propeller shaft 7 is transmitted to the rear diff 19 side, and the torque of the engine 3 is distributed to both of the front wheels W1 and W2 and the rear wheels W3 and W4, so that the four-wheel-drive vehicle 1 is in the four-wheel-drive (4WD) mode. The ECU 50 calculates the drive power to be distributed to the rear wheels W3 and W4 and the supply of hydraulic pressure to the clutch 10 corresponding to the calculated drive power based on detection by various detectors (not illustrated) configured to detect vehicle's travel states. The ECU 50 then outputs a drive signal based on the calculation result to the clutch 10. The ECU 50 thus controls the fastening power of the clutch 10 to control the drive power to be distributed to the rear wheels W3 and W4.

Figure 2:
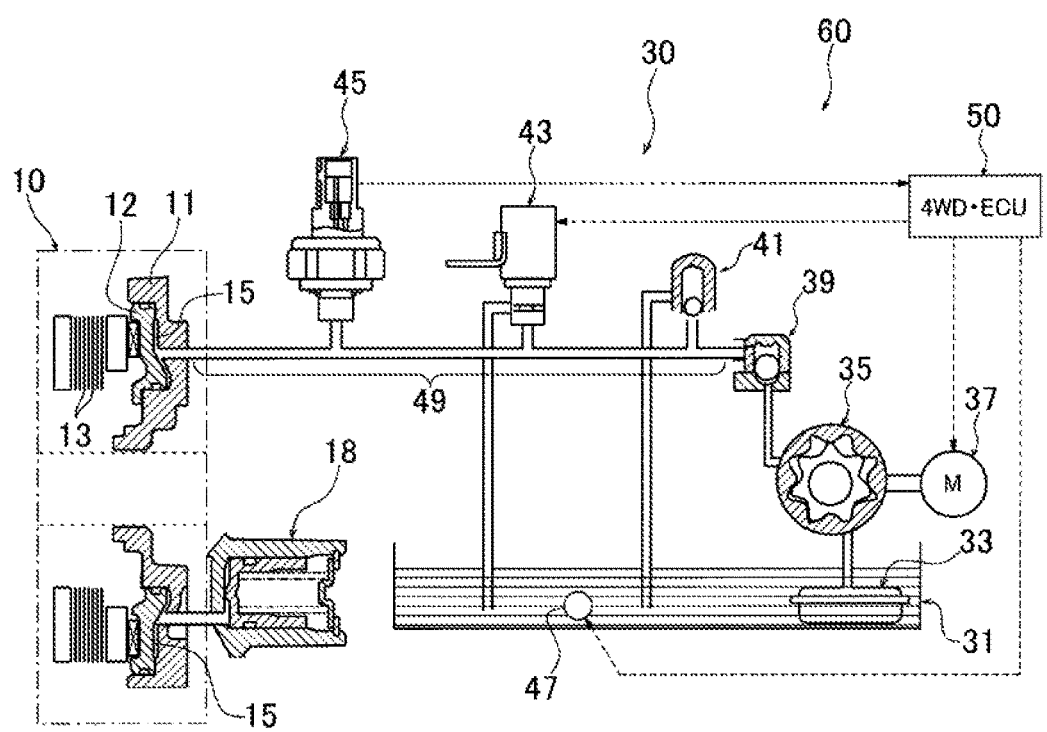
FIG. 2 is a diagram illustrating a hydraulic circuit example of the hydraulic control device according to the embodiment.

FIG. 2 is a hydraulic circuit diagram illustrating the detailed configuration of the hydraulic circuit 30. The hydraulic circuit 30 illustrated in FIG. 2 includes: an oil pump 35 which sucks hydraulic fluid reserved in the oil tank 31 through a strainer 33 and pressure-feeds the hydraulic fluid; a motor 37 which drives the oil pump 35; and a fluid path 40 which allows communication between the oil pump 35 and the piston chamber 15 of the clutch 10.

The clutch 10 includes a cylinder housing 11 and a piston 12. The piston 12 advances and retracts within the cylinder housing 11 to press plural friction materials 13 stacked on top of each other. In the cylinder housing 11, the piston chamber 15 is defined between the cylinder housing 11 and piston 12. The hydraulic fluid is introduced into the piston chamber 15. The piston 12 is placed facing an end of the plural friction materials 13 in the stacking direction. The piston 12 presses the friction materials 13 in the stacking direction by the pressure of the hydraulic fluid supplied to the piston chamber 15 to engage the clutch 10 with a predetermined engagement pressure.

In the fluid path 40, which allows communication between the oil pump 35 and the piston chamber 15, a check valve 39, a relief valve 41, a solenoid valve (an on-off valve) 43, and a hydraulic pressure sensor 45 are provided in this order. The check valve 39 is configured so as to allow the hydraulic fluid to flow from the oil pump 35 side to the piston chamber 15 side but prevent the hydraulic fluid from flowing in the opposite direction. The hydraulic fluid fed to the downstream side of the check valve 39 by drive of the oil pump 35 can be therefore sealed into a fluid path (hereinafter, sometimes referred to as a sealed fluid path) 49 between the check valve 39 and piston chamber 15. The fluid path 49, which is provided with the above-described check valve 39 and oil pump 35, constitutes the sealed-type hydraulic circuit 30. In the embodiment, the check valve 39 is a hydraulic fluid sealing valve to seal the hydraulic fluid in the fluid path 49, which allows communication between the oil pump 35 and the piston chamber 15.

The relief valve 41 is a valve which is opened to release the pressure in the fluid path 49 when the pressure in the fluid path 49 between the check valve 39 and piston chamber 15 abnormally increases to beyond a predetermined threshold. The hydraulic fluid discharged from the relief valve 41 is returned to the oil tank 31. The solenoid valve 43 is an on-off valve which is PWM-controlled (duty-controlled) based on an instruction from the ECU 50 to control opening and closing of the fluid path 49. The hydraulic pressure in the piston chamber 15 is thereby controlled. The hydraulic fluid discharged from the fluid path 49 when the solenoid valve 43 is opened is returned to the oil tank 31. The hydraulic pressure sensor 45 is a hydraulic pressure detector to detect hydraulic pressure in the fluid path 49 and piston chamber 15. The detected values are transmitted to the ECU 50. The piston chamber 15 communicates with an accumulator 18. The accumulator 18 includes an effect of reducing rapid change and pulsation of hydraulic pressure in the piston chamber 15 and fluid path 49. Within the oil tank 31, an oil temperature sensor 47 is provided, which detects the temperature of the hydraulic fluid. The detected value by the oil temperature sensor 47 is transmitted to the ECU 50.

According to the embodiment, as the characteristics of hydraulic pressure given to the piston chamber 15 by the hydraulic circuit 30, first to third characteristics are prepared: the first characteristic is obtained by closing the solenoid valve (on-off valve) 43 and driving the oil pump 35; the second characteristic is obtained by disabling the drive of the oil pump 35 and opening the solenoid valve (on-off valve) 43; and the third characteristic is obtained by opening the solenoid valve (on-off valve) 43 and driving the oil pump 35. The first and second characteristics correspond to hydraulic pressure sealed control, and the third characteristic corresponds to flow rate control (non-sealed control). Which characteristic to use is determined according to control by the ECU (controller) 50.

The ECU (controller) 50 calculates estimation drive power based on the torque of the engine (drive source) 3 and the gear ratio of the automatic transmission 4. Based on the estimation drive power and vehicle travel states, the ECU 50 calculates commanded torque for the front and rear torque distribution clutch (drive power distribution device) 10. Based on the commanded torque, the ECU 50 then calculates commanded hydraulic pressure for the piston chamber 15 of the clutch 10. In the process of supplying hydraulic pressure to the piston chamber 15 in the region (a predetermined low-torque region) where the commanded torque is lower than a predetermined torque, the ECU (controller) 50 performs control according to the third characteristic so that the pressure of the piston chamber 15 become the commanded hydraulic pressure. In the third characteristic, since the solenoid valve (on-off valve) 43 is always opened, hydraulic pressure control for the piston chamber 15 is performed as the flow rate control (non-sealed control) by the motor 37. In the low-torque region, thus, the flow-rate control (non-sealed control) performed for the hydraulic pressure to be supplied to the piston chamber 15 enables highly accurate torque control for the clutch 10, implementing preferable four-wheel-drive control. Moreover, the commanded hydraulic pressure for the piston chamber 15 is determined according to the commanded torque based on the estimation drive power properly calculated and the drive power distribution properly calculated depending on the vehicle travel state. It is therefore possible to implement drive power distribution that provides good merchantability for turning performance and the like.

On the other hand, in the process of pressurizing the piston chamber 15 in a torque region higher than the predetermined torque, the ECU (controller) 50 performs control according to the first characteristic so that the pressure in the piston chamber 15 becomes the commanded hydraulic pressure. In the first characteristic, the solenoid valve (on-off valve) 43 is always closed to seal the hydraulic pressure in the sealed fluid path 49. The hydraulic pressure control for the piston chamber 15 is performed as the hydraulic fluid sealed pressurization control by stepwise (intermittent) drive of the oil pump 35 (motor 37). After the piston chamber 15 is pressurized to the commanded hydraulic pressure according to the first characteristic, the hydraulic fluid sealed in the sealed fluid path 49 is maintained until the piston chamber 15 starts to be depressurized. This can keep constant the torque of the clutch 10 without driving the oil pump 35. In the subsequent process of depressurizing the piston chamber 15, the ECU 50 performs control according to the second characteristic so that the pressure in the piston chamber 15 becomes the commanded hydraulic pressure. In such a manner, the hydraulic pressure control for the piston chamber 15 is performed as the sealed control in a torque region higher than the aforementioned low torque region. This can reduce the frequency of use of the motor 37 for the oil pump 35, thus improving the durability.

Moreover, at transition from the third characteristic to the first characteristic, the ECU (controller) 50 performs control so as to limit drive of the motor 37. As described below in detail, this is because switching from the flow-rate control to the sealed control at the transition from the third to first characteristic is likely to cause overshoot in the hydraulic pressure, which needs to be prevented (a measure for hydraulic pressure overshoot).

Figure 3:
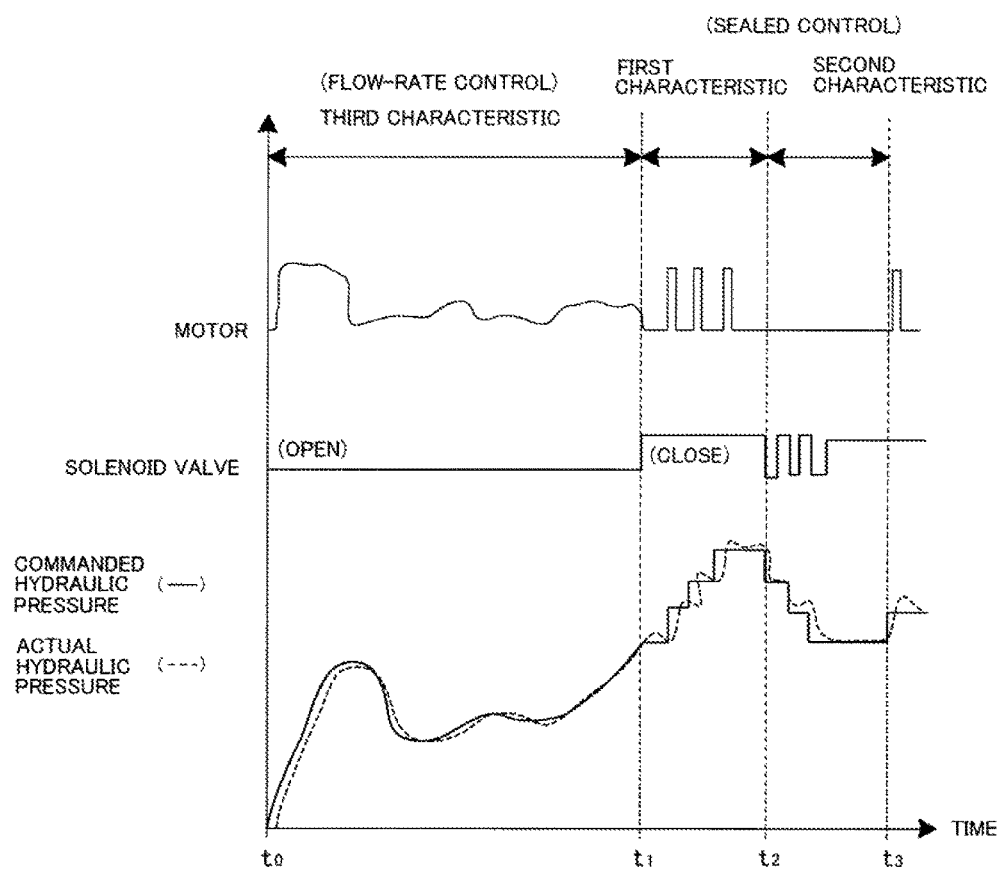
FIG. 3 is a time chart illustrating a switching example of hydraulic control characteristics according to the embodiment.

FIG. 3 is a time chart illustrating a switching example of the hydraulic control characteristics according to the present invention which is performed based on the control by the ECU (controller) 50. For convenience of explanation, FIG. 3 illustrates a case where the measurement for hydraulic pressure overshoot is not performed at the transition from the third to first characteristic. In FIG. 3, the upper graph illustrates the instruction to drive the motor 37; the middle graph illustrates the open and close states of the solenoid valve (on-off valve) 43; and the lower graph illustrates the commanded hydraulic pressure (solid line) and actual hydraulic pressure (dashed line) in the piston chamber 15. Between time $t_0$ and $t_1$, hydraulic pressure control (flow-rate control) according to the third characteristic is performed. Between time $t_1$ and $t_2$, hydraulic pressure control (sealed pressurization control) according to the first characteristic is performed, and between time $t_2$ and $t_3$, hydraulic pressure control (sealed depressurization control) according to the second characteristic is performed. In other words, by the time $t_1$, the target torque for the clutch 10 to distribute drive power to the rear wheels is in a predetermined low-torque region, and hydraulic pressure control is performed according to the third characteristic. At the time $t_1$, the target torque for the clutch 10 reaches to the torque region higher than a predetermined torque, and the commanded hydraulic pressure corresponding thereto is specified. Moreover, the hydraulic pressure control characteristic is then switched to the first characteristic (sealed pressurization control). At the time $t_2$, the commanded hydraulic pressure is reduced, and the hydraulic pressure control characteristic is thereby switched to the second characteristic (sealed depressurization control).

Figure 4:
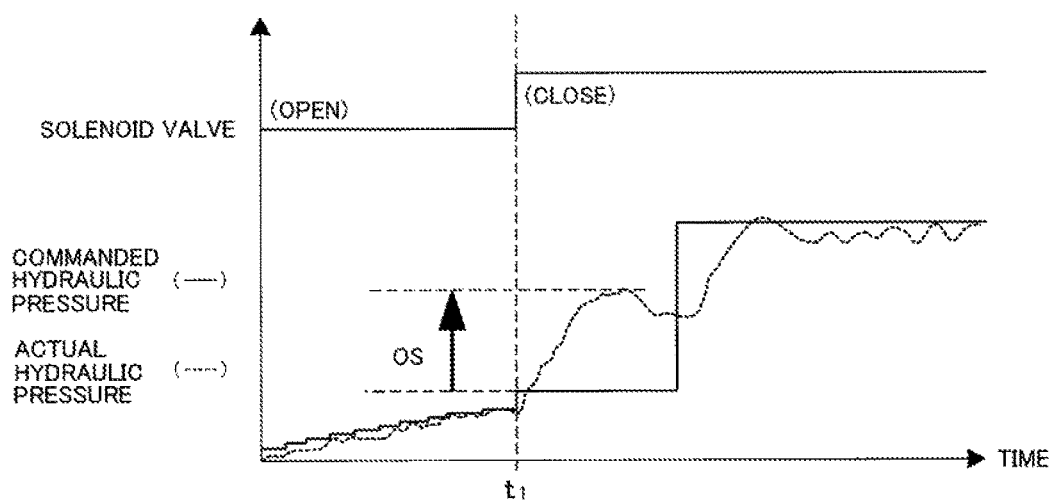
FIG. 4 is an enlarged diagram of a part including transition from third to first characteristic in FIG. 3.

FIG. 4 is an enlarged diagram illustrating a part around the time $t_1$ (the process of transition from the third to first characteristic) in FIG. 3. The hydraulic pressure control (flow-rate control) according to the third characteristic is performed until just before the time $t_1$, and the motor command value corresponding to the deviation between the commanded hydraulic pressure (solid line) and actual hydraulic pressure (dashed line) is given to the motor. After the solenoid valve (on-off valve) 43 is closed at switching to the first characteristic, the inertial motion of the motor 37 due to the motor command value corresponding to the deviation remains, and the oil pump 35 is thereby driven. This might increase the hydraulic pressure (actual hydraulic pressure) in the sealed fluid path 49 to an undesired level. The undesired level of hydraulic pressure (actual hydraulic pressure) in the sealed fluid path 49 is indicated as overshoot OS in FIG. 4. The overshoot OS of the actual hydraulic pressure is not preferable because the overshoot OS produces engagement torque equal to or more than the target torque in the clutch 10, degrading the quality of drive power distribution.

Figure 5:
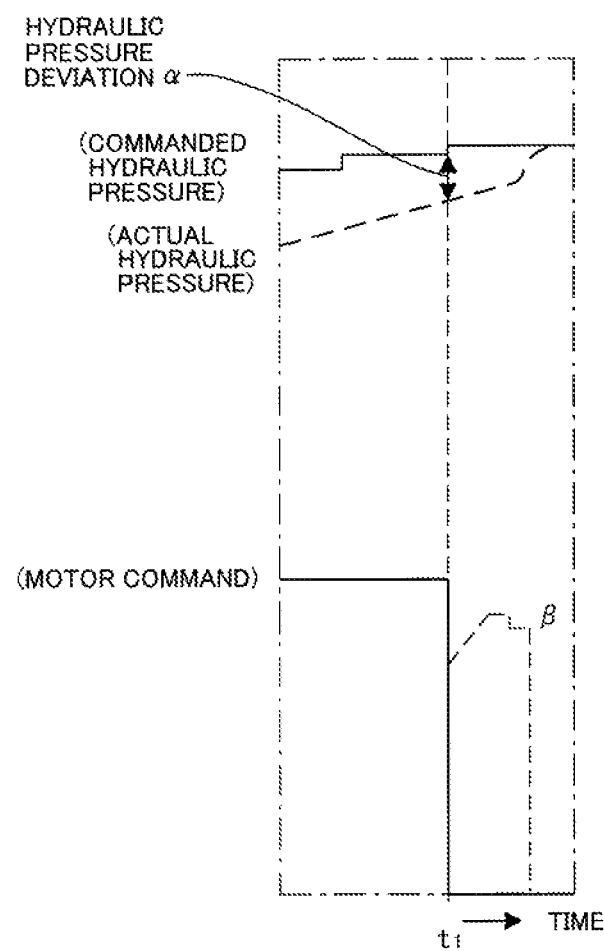
FIG. 5 is an enlarged time chart illustrating a measure for hydraulic pressure overshoot according to the embodiment.

FIG. 5 is a time chart illustrating a measure for hydraulic pressure overshoot according to the embodiment. FIG. 5 enlarges the control example at transition from the third to first characteristic. The upper part illustrates the commanded hydraulic pressure (solid line) and actual hydraulic pressure (dashed line) in the piston chamber 15, and the lower part illustrates the motor command value. For example, at the time $t_1$, there is an instruction to switch from the third characteristic (flow-rate control) to the first characteristic (sealed pressurization control). With no measure for hydraulic pressure overshoot, the drive command value for the motor 37 is generated as indicated by dashed line β due to deviation α between the commanded hydraulic pressure (solid line) and the actual hydraulic pressure (dashed line) produced at the aforementioned instruction to switch. This causes the overshoot OS described above. In this embodiment, when there is an instruction at the time $t_1$ to switch from the third characteristic (flow-rate control) to the first characteristic (sealed pressurized control), the motor command value is reduced (to zero, for example) as indicated by the solid line in the lower part of FIG. 5. In other words, the command value β corresponding to the deviation α is reduced. In such a manner, at the transition from the third characteristic (flow-rate control) to the first characteristic (sealed pressurized control), the hydraulic pressure control is performed to limit drive of the motor 37, so that the motor 37 cannot be inertially driven according to the command value β corresponding to the deviation α. This can prevent an undesired increase in the hydraulic pressure (actual hydraulic pressure) in the sealed fluid path 49.

Figure 6:
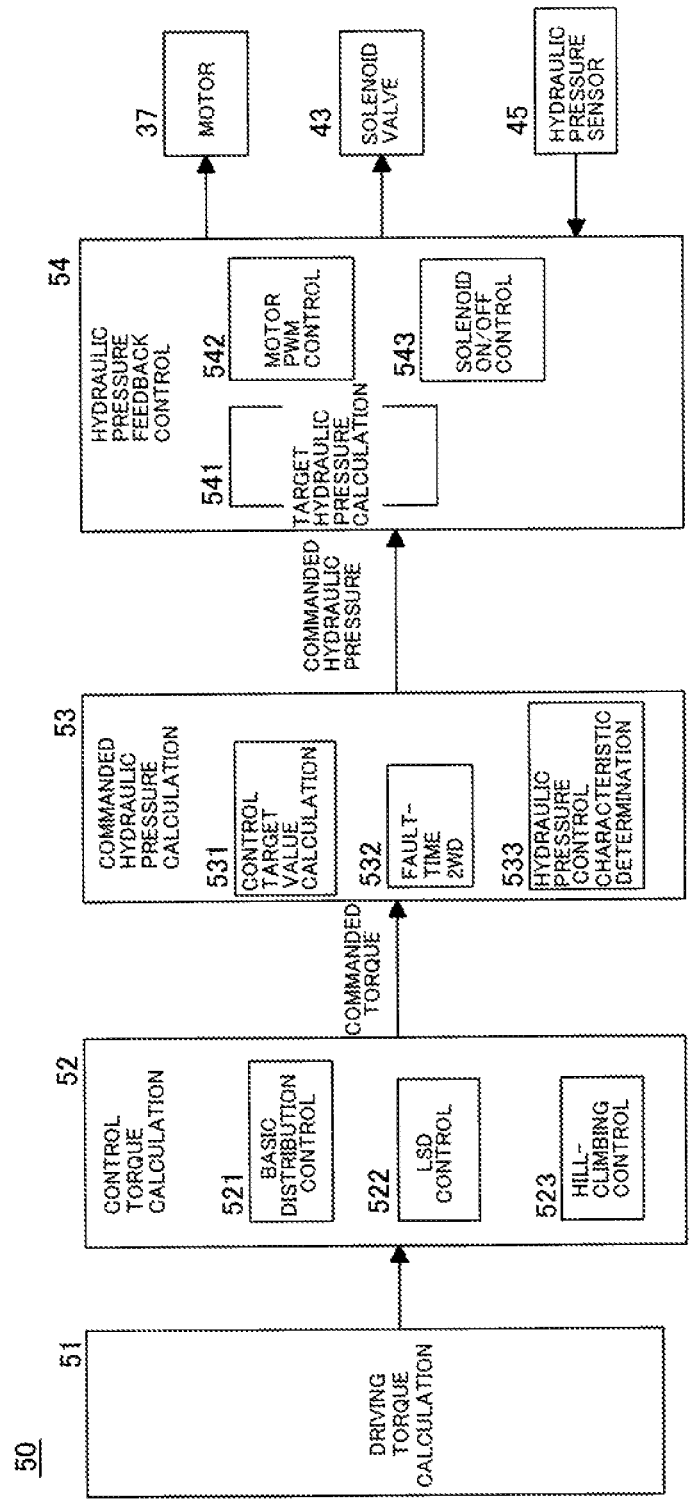
FIG. 6 is a diagram illustrating main functional blocks of a 4WD•ECU functioning as a hydraulic control device.

FIG. 6 illustrates main functional blocks of the 4WD•ECU (controller) 50. A driving torque calculation block 51 calculates driving torque (estimation drive power) required for the vehicle 1 depending on the travel conditions (the torque of the engine 3, the selected gear, the shift position, and the like) of the vehicle 1. A control torque calculation block 52 determines the distribution of driving torque to the front and rear wheels depending on various control factors with a basic distribution control (basic distribution control for drive power to the front wheels W1 and W2 and rear wheels W3 and W4) block 521, an LSD control block 522, a hill-climbing control block 523, and the like and calculates the commanded torque for the front and rear torque distribution clutch (drive power distribution device) 10. A commanded hydraulic pressure calculation block 53 calculates the commanded hydraulic pressure for the clutch 10 based on the commanded torque. Specifically, a control target value calculation block 531 calculates a control target value (that is, the commanded hydraulic pressure) for the clutch 10 based on the commanded torque, and a fault-time 2WD block 532 calculates a control target value (that is, the commanded hydraulic pressure) for switching the vehicle 1 to the 2WD mode in the event of a fault. In normal times, the control target value calculated by the control target value calculation block 531 is outputted as the commanded hydraulic pressure. In the event of a fault, the control target value calculated by the fault-time 2WD block 532 is outputted as the commanded hydraulic pressure. A hydraulic pressure feedback control block 54, through a target hydraulic pressure calculation block 541, calculates target hydraulic pressure (that is, hydraulic pressure deviation) for the clutch 10 based on the deviation between the commanded hydraulic pressure given by the commanded hydraulic pressure calculation block 53 and actual hydraulic pressure (feedback signal from the hydraulic pressure sensor 45) and controls the motor 37 or solenoid valve 43 according to the calculated target hydraulic pressure (that is, hydraulic pressure deviation) (a motor PWM control block 542 and a solenoid ON/OFF control block 543). The motor PWM control block 542 generates a PWM drive instruction signal for the motor 37 based on the target hydraulic pressure (that is, the hydraulic pressure deviation). The solenoid ON/OFF control block 543 generates an ON (close)/OFF (open) indicating signal for the solenoid valve 43 based on the hydraulic pressure deviation (target hydraulic pressure) between the commanded hydraulic pressure and the feedback signal (actual hydraulic pressure) from the hydraulic pressure sensor 45.

The commanded hydraulic pressure calculation block 53 includes a hydraulic pressure control characteristic determination block 533. The hydraulic pressure control characteristic determination block 533 determines which hydraulic pressure control characteristic to use among the first to third characteristics based on the commanded torque (required torque) given from the control torque calculation block 52 and generates a hydraulic pressure control characteristic signal indicating the determined characteristic. The hydraulic pressure control characteristic signal is given to the hydraulic pressure feedback control block 54, and the commanded hydraulic pressure calculation block 541, motor PWM control block 542, and solenoid ON/OFF control block 543 thereby operate according to the determined hydraulic pressure control characteristic. As an example, the hydraulic pressure control characteristic determination block 533 generates the hydraulic control characteristic signal indicating the third characteristic when the commanded torque is not higher than a predetermined torque: generates the hydraulic pressure control characteristic signal indicating the first characteristic during the period when the commanded torque is on a rising trend in a region higher than the predetermined torque: and then generates the hydraulic pressure control characteristic signal indicating the second characteristic when the trend of the commanded torque then shifts to a falling trend. Herein, the predetermined value is properly determined on a design basis. In the commanded hydraulic pressure calculation block 53, the control target value calculation block 531 generates continuous or stepwise commanded hydraulic pressure as illustrated in the lower graph of FIG. 3 based on the commanded torque, depending on which hydraulic control characteristic to use for hydraulic pressure control according to the hydraulic pressure control characteristic signal. Specifically, to control the hydraulic pressure according to the third characteristic, the control target value calculation block 531 generates a commanded hydraulic pressure signal which changes continuously with continuous changes in the commanded torque. According to the third characteristic, therefore, the motor 37 is subjected to continuous flow-rate control, implementing highly accurate drive power distribution. To control the hydraulic pressure according to the first or second characteristic, the control target value calculation block 531 generates a commanded hydraulic pressure signal which changes stepwise with changes in the commanded torque. According to the first characteristic, therefore, the motor 37 is controlled in s stepwise manner, thus relatively reducing the frequency of use of the motor. According to the second characteristic, the solenoid valve 43 is subjected to stepwise ON (close)/OFF (open) control. The determination whether the commanded torque is on a rising trend or falling trend may be performed based on filtering of the commanded torque varying with time based on low-pass filter characteristics as an example.

Figure 7:
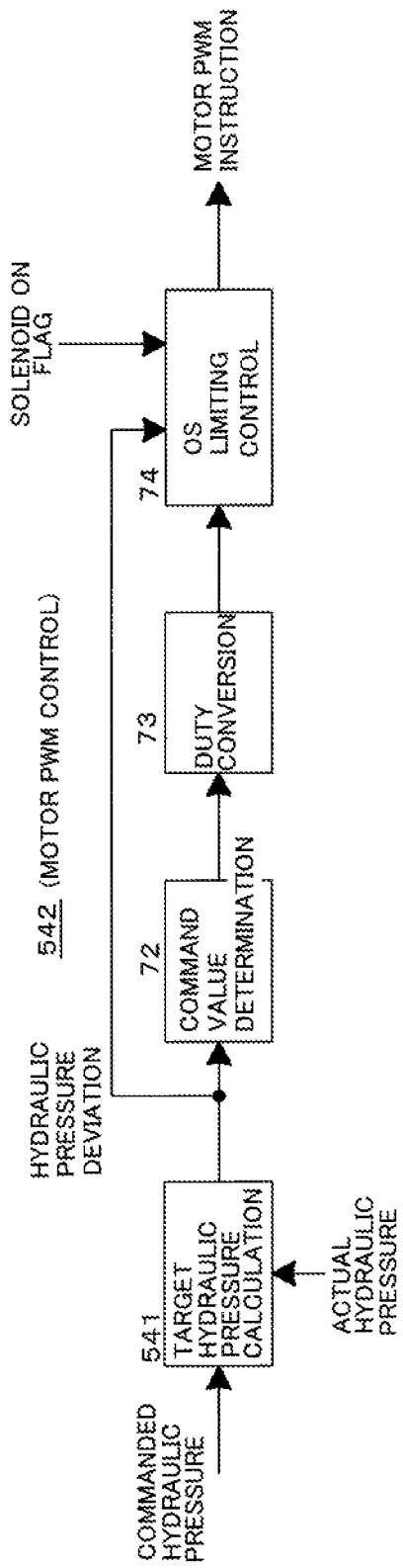
FIG. 7 is a diagram mainly illustrating a configuration example of a motor PWM control block.

FIG. 7 illustrates mainly a configuration example of the motor PWM control block 542. A deviation calculator 71 calculates the deviation between the commanded hydraulic pressure and actual hydraulic pressure (feedback signal). A command value determination block 72 determines the motor command value based on the deviation. A duty converter 73 converts the motor command value to the duty value of the PWM. An overshoot (OS) limiting controller 74 performs limiting control to limit the motor command value (duty value) at transition from the third characteristic (flow-rate control) to the first characteristic (sealed pressurization control) as the measure for hydraulic pressure overshoot. The output from the overshoot limiting controller 74 is given to the driver of the motor 37 as a motor PWM instruction signal.

Figure 8:
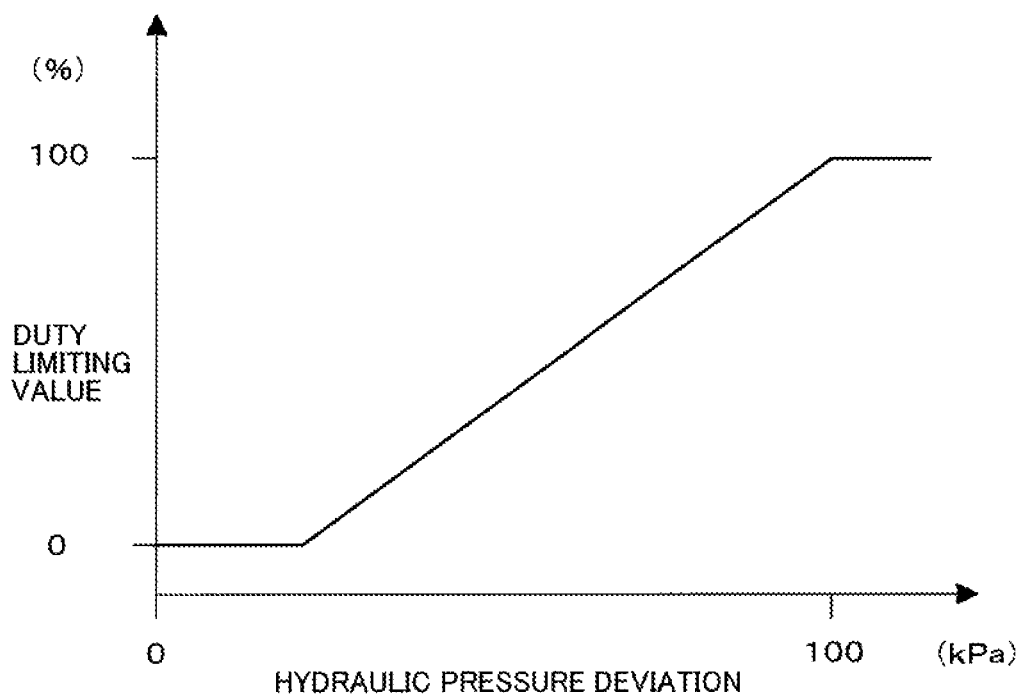
FIG. 8 is a graph illustrating an example of a motor command value limiting control characteristic.

FIG. 8 is a graph illustrating an example of the characteristic of motor command value limiting control performed by the overshoot limiting controller 74. A duty limit value is defined based on the deviation (hydraulic pressure deviation) between the commanded hydraulic pressure and actual hydraulic pressure. The overshoot limiting controller 74 performs upper limit control so that the motor command duty value (a ratio of 0 to 100%) outputted from the duty converter 73 is not larger than the duty limit value. As an example, in the region of hydraulic pressure deviation larger than 100 Kpa, the limit value is 100%, and the upper limit has no practical effect. In the region of hydraulic pressure deviation not larger than 100 Kpa, the smaller the hydraulic pressure deviation, the smaller the limit value is. In the region of hydraulic pressure deviation not larger than a predetermined minute value x, the limit value is 0%, and the motor command value is virtually set to 0.

As an example, the overshoot limiting controller 74 performs the aforementioned limiting control according to a solenoid ON flag indicating that the solenoid valve 43 is ON (closed). When the motor 37 is controlled according to the third characteristic (flow-rate control), therefore, the motor command duty value outputted from the duty converter 73 is not subjected to limiting control and is directly given to the driver of the motor 37 as a motor PWM instruction signal. On the other hand, at transition of the hydraulic control characteristic from the third characteristic (flow-rate control) to the first characteristic (sealed pressurization control), the solenoid valve 43 is turned on (closed), and the overshoot limiting controller 74 therefore works. The overshoot limiting controller 74 performs upper limit control for limiting the drive of the motor 37 in the region where the deviation between the commanded hydraulic pressure and actual hydraulic pressure is small (not larger than 100 kPa, for example). For example, in the region where the hydraulic pressure deviation is not larger than the predetermined minute value x, the limit value is 0%, and the motor command value is virtually set to 0. Accordingly, even if the hydraulic pressure deviation remains to some degree, the motor 37 is not driven since the motor command value is limited to 0. The hydraulic fluid by the inertial motion of the motor 37 cannot be supplied to the fluid path 49 which is switched to the sealed state when the solenoid valve 43 is turned on (closed). It is therefore possible to solve the problem of the overshoot OS as illustrated in FIG. 4.

As described above, in the region where the deviation between the commanded hydraulic pressure and actual hydraulic pressure is small (not higher than 100 kPa, for example), the upper limit control for limiting drive of the motor 37 is performed. In the region where the deviation between the commanded hydraulic pressure and actual hydraulic pressure is small, the actual hydraulic pressure is close to the commanded hydraulic pressure. Accordingly, the overshoot problem is likely to occur even if the undesired increase in the actual hydraulic pressure is comparatively slight. To the contrary, in the region where the deviation between the commanded hydraulic pressure and actual hydraulic pressure is large, the actual hydraulic pressure is away from the commanded hydraulic pressure, and an increase in the actual hydraulic pressure is less likely to create the overshoot problem. In such a case, drive of the motor is not limited (or limited by a smaller degree), so that the actual hydraulic pressure easily follows the commanded hydraulic pressure. By selectively limiting the drive of the motor 37 depending on the magnitude of the hydraulic pressure deviation in such a manner, the overshoot problem of hydraulic pressure can be solved efficiently.

In the region where the deviation between the commanded hydraulic pressure and actual hydraulic pressure is small (not larger than 100 KPa, for example), the hydraulic pressure control is performed so that the smaller the hydraulic pressure deviation, the higher the ratio at which the drive of the motor 37 is limited, according to the characteristic illustrated in FIG. 8. In other words, the smaller the hydraulic pressure deviation, the lower the upper limit, and the more the drive of the motor 37 is limited. In such a manner, even in the region where the deviation between the commanded hydraulic pressure and actual hydraulic pressure is small (not larger than 100 KPa, for example), the larger the deviation, the lower the ratio at which the drive of the motor 37 is limited. This can relatively improve the following capability of the hydraulic pressure control.

In the aforementioned embodiment, the hydraulic fluid sealing valve which closes the fluid path 49 to switch from the period of increasing the pressure to the period of keeping the pressure is the check valve 39 but may be an on-off solenoid valve instead. In that case, the accumulator 18 may be omitted.

The invention claimed is:
1. A hydraulic control device of a drive power distribution device of a four-wheel drive vehicle, the four-wheel drive vehicle including:
a drive power transmission path to transmit drive power from a drive source to a main driving wheel and an auxiliary driving wheel; and
a drive power distribution device provided between the drive source and the auxiliary driving wheel in the drive power transmission path, the drive power distribution device being composed of a frictional engagement element including: a plurality of friction materials stacked on top of each other; and a piston chamber generating hydraulic pressure against a piston configured to press the friction materials in the stacking direction to engage the friction materials, the hydraulic control device comprising:
a hydraulic circuit including: an oil pump which is driven with a motor and supplies hydraulic fluid to the piston chamber; a hydraulic fluid sealing valve configured to seal the hydraulic fluid to a fluid path allowing communication between the oil pump and the piston chamber; an on-off valve configured to open and close the fluid path between the hydraulic fluid sealing valve and piston chamber; and an accumulator configured to reserve the hydraulic pressure for the piston chamber; and
a controller configured to control drive of the oil pump by the motor and opening and closing of the on-off valve to supply a desired hydraulic pressure to the piston chamber, wherein
characteristics of the hydraulic pressure given to the piston chamber through the hydraulic circuit include; a first characteristic obtained by closing the on-off valve and driving the oil pump; a second characteristic obtained by disabling the drive of the oil pump and opening the on-off valve; and a third characteristic obtained by opening the on-off valve and driving the oil pump, and
the controller
in the process of supplying hydraulic pressure to the piston chamber in a predetermined low-torque region, performs control according to the third characteristic so that the pressure in the piston chamber becomes a commanded hydraulic pressure,
in the process of pressurizing the piston chamber in a torque region higher than the low-torque region, performs control according to the first characteristic so that the pressure in the piston chamber becomes the commanded hydraulic pressure, and
in the subsequent process of depressurizing the piston chamber, performs control according to the second characteristic so that the pressure in the piston chamber becomes the commanded hydraulic pressure, and
the controller performs control to limit the drive of the motor at transition from the third characteristic to the first characteristic.

2. The hydraulic control device of a drive power distribution device according to claim 1, wherein
at the transition from the third characteristic to the first characteristic, the controller performs control to limit the drive of the motor in the region where the deviation between the commanded hydraulic pressure and actual hydraulic pressure in the piston chamber is small.

3. The hydraulic control device of a drive power distribution device according to claim 2, wherein
in the region where the deviation between the commanded hydraulic pressure and actual hydraulic pressure in the piston chamber is small, the controller performs control so that the drive of the motor is limited at a higher ratio when the deviation is smaller.

* * * * *